May 10, 1949.

F. W. COFFING 2,470,018

METHOD OF AND MECHANISM FOR LIFTING
PORTIONS OF VEHICLES
Filed June 2, 1945

INVENTOR.
FREDRICK W. COFFING.
BY
Lockwood, Goldsmith & Galt
ATTORNEYS.

Patented May 10, 1949

2,470,018

UNITED STATES PATENT OFFICE 2,470,018

METHOD OF AND MECHANISM FOR LIFTING PORTIONS OF VEHICLES

Fredrick W. Coffing, Danville, Ill., assignor to Coffing Hoist Company, Danville, Ill., a corporation Application June 2, 1945, Serial No. 597,166

2 Claims. (Cl. 254—133)

This invention relates to a device for raising and lowering a portion of an automobile and the like for effecting wheel exchange, tire replacement, etc.

The chief object of this invention is to provide simple means for not only raising and lowering such a portion of an automobile but to retain the vehicle spring means in partially and substantially static loaded condition.

The chief feature of the present invention resides in the tensioned lifting means and its direct association with the vehicle spring shackle whereby the aforesaid objective is accomplished.

Another feature of the invention resides in the elongated hook terminating the tensionable lifting means and providing a guidable connector.

Other objects and features of the invention will be set forth more fully hereinafter.

The full nature of the invention will be understood from the accompanying drawings and the following description and claims:

Figure 1:
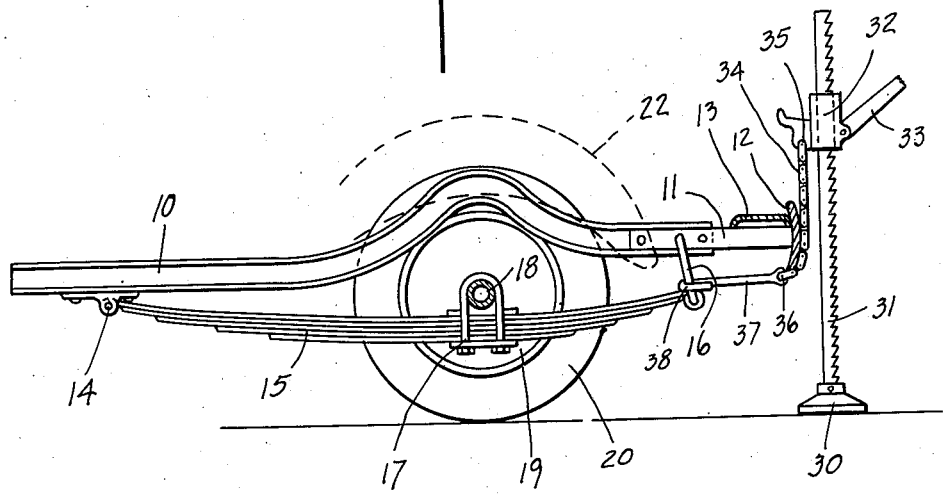
Fig. 1 is a side elevational view of an end of an automobile with the invention applied thereto prior to vehicle elevation.
Figure 2:
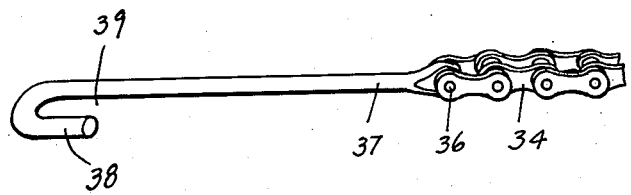
Fig. 2 is a perspective view of a chain embodiment of tension means and guidable, shackle engaging, hook termination thereof.

In the drawing, 10 indicates a chassis frame having sides and ends of conventional or desired character. To the same, by arms 11, is secured a bumper 12. Some vehicles include splash guard 13 therebetween.

Secured as at 14 to the frame and appreciably inwardly of the end thereof is one end of leaf spring 15. The other end, adjacent bumper 12, is secured by a shackle (rigid link) structure 16 to the frame 10. To the spring 15, as at 17, is secured the axle structure 18 mounting vehicle wheel 19 having tire 20 thereon.

All the foregoing is conventional vehicle structure.

When subject to normal use, it is obvious that the weight of frame 10, the body (not shown), engine (not shown) and fenders, see dotted line showing 22, is applied to the several springs 15 and initially normally loads same. Also occupant weight also loads the springs. This is the static loading.

In vehicle movement, wheel engagement with obstructions, or dropping into holes, causes the spring to flex in the well-known manner. When a tire is punctured and the air escapes, the portion of the vehicle adjacent same lowers in accordance with tire collapse, but static loading is still retained.

For repair purposes obviously the wheel and axle must be elevated to that degree necessary to have clearance between a normally inflated tire and the ground, so that the customary tire change can be effected.

Certain standard automobiles are provided with so-called bumper jacks having a standard about three feet long and a longitudinally movable bumper engaging member thereon. This extreme length of standard is necessitated because initial elevation of the bumper therewith only relieves the spring of the static load thereon and does not raise the axle for ground clearance purposes.

When static load is relieved, additional member elevation on the standard secures simultaneous axle and frame elevation so that ground clearance can be obtained sufficient for tire exchange. At this time the car body is exceptionally elevated and the jack is not firmly based and its standard is not perpendicular or vertical, the jack will cant and slip from bumper engagement and drop the car.

Because of this dangerous possibility, some car manufacturers provide two jacks, as well understood in the art.

It has been proposed to hold or retain the vehicle spring under an appreciable portion of its static load by suitable means and apply a strut below some portions of the vehicle to simultaneously force upwardly, by extension, the entire vehicle portion to be elevated. This requires vehicle to road clearance sufficient for the application of the extensible strut, and such clearance is not always possible to obtain. Furthermore, in many cases, initial location of the strut frequently is a dirty operation.

The present invention eliminates these objections. No extensible strut is required and vehicle connection is easily effected without regard to road clearance if the axle is not mired down, and even then may be effected with a minimum of effort, etc.

The present invention contemplates the use of a jack having a base 30, standard 31 carried thereby in any suitable manner, runner member 32 movable longitudinally thereof in either direction for elevation and lowering and by actuating handle 33 and suitable mechanism not shown.

Member 32 has secured to it at 35 a chain 34 or other flexible normally inextensible member. The other end of the chain 34 at 36 has secured to it an elongated hook 37 with reverse portion 38 at its free end.

Operation

The base 30 of the jack is placed immediately adjacent bumper 12 and in substantial alignment with the wheel to be raised. The chain lies between the standard and bumper. The vehicle brake may be locked, or blocked against movement toward the jack, if desired. The elongated hook 37—38 is passed inwardly below the frame and toward shackle structure 16. Usually this comprises a pair of spaced links. The bent free end of the hook may be passed between said links and turned angularly (about 90°) and then drawn back so that one of said spaced links is seated in groove 39 of said hook or, easier still, the hook may be applied from the exterior of a link and to that link.

The shackle 16 is directed upwardly toward the frame and inwardly of the bumper from the bumper adjacent end of spring 15. When the spring is unloaded the shackle 16 may extend vertically or slightly in the opposite direction.

Upon hook connection to the shackle as aforesaid, the handle 33 is actuated to elevate member 32 on standard 31. This takes up all slack in the chain and puts the chain and hook under tension only. Since the standard 31 is positioned immediately adjacent bumper 12 and chain 34 is in contact therewith, continued elevation of member 32 substantially holds shackle 16 in its static loaded position and thus spring 15 is retained in its substantially static loaded position. Further elevation of member 32 obviously elevates the vehicle adjacent portions while the parts thereof are held in that relationship.

The resulting operation is static load substantial retention and vehicle portion elevation solely by tension force application through the flexible normally inextensible means.

While the invention has been illustrated and described in great detail in the drawings and foregoing description, the same is to be considered as illustrative and not restrictive in character.

The several modifications described herein, as well as others which will readily suggest themselves to persons skilled in this art, all are considered to be within the broad scope of the invention, reference being had to the appended claims.

The invention claimed is:

1. A method of elevating a portion of a vehicle having a frame, a load spring directed toward an end thereof, a bumper carried by that end of the frame, a wheel supporting axle carried by the spring inwardly of the bumper end of the spring, and a shackle between the bumper end of the spring and the frame adjacent the bumper connection thereto, the shackle being directed upwardly from the spring toward the frame and away from the bumper when the spring is static loaded, comprising positioning a jack immediately adjacent the bumper, the jack having a movable member thereon with a depending flexible non-extensible means terminating at the free end in a hook, and with the non-extensible means externally engaging the bumper and extending inwardly below same and toward the shackle, detachably connecting the hook directly to the shackle adjacent the shackle and spring connection, and then continuously elevating the member a sufficient distance to successively tension the means to initially tauten same, then retain the shackle and spring in substantially static loaded relative relation, and finally elevate the associated vehicle portion with the spring in substantially static loaded relation to the frame.

2. Mechanism for lifting a portion of a vehicle having a vehicle frame, a bumper carried thereby at an end thereof, a spring, a shackle structure connecting a spring end to the frame adjacent the end thereof, and an axle connected to the spring for vehicle support, comprising a jack having a standard extending upwardly and positioned adjacent the bumper, a member movable longitudinally of the standard, and a non-extensible flexible means connected to the member and depending therefrom and bearing upon and initially slidable relative to the bumper, and elongated hook means carried by the free end of said flexible means and adapted for ready and direct attachment to and detachment from the spring-shackle structure connection, the hook means having a length approximately equal to the distance between the spring shackle and the bumper.

FREDRICK W. COFFING.

REFERENCES CITED

The following references are of record in the file of this patent:

UNITED STATES PATENTS

| Number | Name | Date |
| --- | --- | --- |
| 1,941,854 | Dwork | Jan. 2, 1934 |
| 1,998,703 | Bramley-Moore | Apr. 23, 1935 |
| 2,083,942 | Chase | June 15, 1937 |
| 2,189,665 | Kirby | Feb. 6, 1940 |
| 2,378,836 | Coffing | June 19, 1945 |